United States Patent
Li et al.

(10) Patent No.: US 11,939,186 B2
(45) Date of Patent: Mar. 26, 2024

(54) WIRELESS SIGNAL DEVICE, SYSTEM AND METHOD FOR ELEVATOR SERVICE REQUEST

(71) Applicant: Otis Elevator Company, Farmington, CT (US)

(72) Inventors: Kai Li, Shanghai (CN); Shenhong Wang, Shanghai (CN); SiQi Ma, Shanghai (CN); Haofeng Hou, Shanghai (CN); Fu Qi, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1406 days.

(21) Appl. No.: 16/360,169

(22) Filed: Mar. 21, 2019

(65) Prior Publication Data
US 2019/0292010 A1   Sep. 26, 2019

(30) Foreign Application Priority Data
Mar. 23, 2018  (CN) ......................... 201810245130.X

(51) Int. Cl.
*B66B 1/46* (2006.01)
*B66B 1/34* (2006.01)
(Continued)

(52) U.S. Cl.
CPC .............. *B66B 1/468* (2013.01); *B66B 1/34* (2013.01); *B66B 1/3461* (2013.01); *B66B 1/46* (2013.01);
(Continued)

(58) Field of Classification Search
CPC ......... B66B 1/468; B66B 1/34; B66B 1/3461; B66B 1/46; B66B 2201/20;
(Continued)

(56) References Cited

U.S. PATENT DOCUMENTS 5,412,163 A * 5/1995 Tsuji ..................... B66B 1/2408
187/382
5,984,051 A * 11/1999 Morgan ................ B66B 1/2408
187/316
(Continued)

FOREIGN PATENT DOCUMENTS

CN    204980676 U    1/2016
CN    106966242 A    7/2017
(Continued)

OTHER PUBLICATIONS

European Search Report for application EP 19164743.7, dated Dec. 12, 2019, 89 pages.
(Continued)

*Primary Examiner* — Michael I Ezewoko
(74) *Attorney, Agent, or Firm* — CANTOR COLBURN LLP

(57) ABSTRACT

Provided are a wireless signal apparatus and an elevator service request system and method, which belong to the field of intelligent elevator control technologies. In the elevator service request system of the present invention, a corresponding wireless signal is broadcast by a wireless signal apparatus of an elevator system and the wireless signal is received by a personal mobile terminal. The personal mobile terminal is provided with an elevator service request application component running at an application layer of an operating system thereof. The wireless signal apparatus includes a location notification unit used for broadcasting corresponding location marker data. The elevator service request system includes a wake-up module running at a system layer of the operating system of the personal mobile terminal. The wake-up module is used for waking up the elevator service request application component in response to reception of the location marker data.

16 Claims, 3 Drawing Sheets

(51) Int. Cl.
  *G06F 1/3206* (2019.01)
  *G06F 1/3209* (2019.01)
  *H04W 4/02* (2018.01)
  *H04W 4/80* (2018.01)
  *H04W 52/02* (2009.01)
(52) U.S. Cl.
  CPC .......... *G06F 1/3206* (2013.01); *G06F 1/3209* (2013.01); *H04W 4/02* (2013.01); *H04W 4/80* (2018.02); *H04W 52/02* (2013.01); *H04W 52/0264* (2013.01); *B66B 2201/20* (2013.01); *B66B 2201/216* (2013.01); *B66B 2201/4653* (2013.01)
(58) Field of Classification Search
  CPC ..... B66B 2201/216; B66B 2201/4653; H04W 4/80; H04W 4/02; H04W 52/02; H04W 52/0264; G06F 1/3209
  See application file for complete search history.

(56) References Cited

U.S. PATENT DOCUMENTS

| | | | | |
|---|---|---|---|---|
| 6,109,396 | A * | 8/2000 | Sirag | B66B 1/468 187/392 |
| 6,202,799 | B1 * | 3/2001 | Drop | B66B 1/2408 187/391 |
| 6,209,685 | B1 * | 4/2001 | Zaharia | B66B 1/468 187/388 |
| 6,257,373 | B1 * | 7/2001 | Hikita | B66B 1/2458 187/387 |
| 6,382,363 | B1 * | 5/2002 | Friedli | B66B 1/468 187/392 |
| 6,772,862 | B2 * | 8/2004 | Friedli | B66B 1/2458 187/382 |
| 6,834,386 | B1 * | 12/2004 | Douceur | G06F 9/4881 718/107 |
| 7,051,098 | B2 * | 5/2006 | Masters | H04L 43/0811 709/224 |
| 7,328,775 | B2 * | 2/2008 | Zaharia | B66B 1/18 187/391 |
| 7,353,915 | B2 * | 4/2008 | Zaharia | B66B 1/468 187/391 |
| 7,380,218 | B2 * | 5/2008 | Rundell | G06F 9/451 715/796 |
| 7,421,509 | B2 * | 9/2008 | Lolayekar | H04L 67/1008 370/231 |
| 7,440,751 | B2 * | 10/2008 | Boros | G06F 1/3203 455/418 |
| 7,500,544 | B2 * | 3/2009 | Hakala | B66B 1/463 187/382 |
| 7,552,800 | B2 * | 6/2009 | Puskala | B66B 1/468 187/392 |
| 7,562,746 | B2 * | 7/2009 | Yoshikawa | B66B 1/2458 187/382 |
| 7,581,622 | B2 * | 9/2009 | Amano | B66B 1/468 187/392 |
| 7,640,547 | B2 * | 12/2009 | Neiman | G06Q 10/02 705/5 |
| 7,712,586 | B2 * | 5/2010 | Legez | B66B 1/20 187/387 |
| 7,716,672 | B2 * | 5/2010 | Douceur | G06F 9/4881 718/107 |
| 7,765,553 | B2 * | 7/2010 | Douceur | G06F 9/4881 718/107 |
| 7,774,781 | B2 * | 8/2010 | Dees | G06F 3/067 719/310 |
| 7,787,489 | B2 * | 8/2010 | Caulfield | H04W 99/00 455/414.2 |
| 7,882,938 | B2 * | 2/2011 | Blackaby | B66B 1/468 187/391 |
| 7,885,222 | B2 * | 2/2011 | Cole | H04W 48/16 455/452.2 |
| 7,904,673 | B2 * | 3/2011 | Riska | G06F 3/0611 711/154 |
| 7,936,249 | B2 * | 5/2011 | Friedli | G06F 21/32 340/5.5 |
| 7,945,914 | B2 * | 5/2011 | Hasiuk | G06F 9/485 718/107 |
| 7,962,911 | B2 * | 6/2011 | Cheng | G06F 9/485 718/100 |
| 7,970,902 | B2 * | 6/2011 | Rolia | H04L 67/30 709/226 |
| 8,028,060 | B1 * | 9/2011 | Wyld | H04L 43/0805 709/224 |
| 8,061,485 | B2 * | 11/2011 | Finschi | B66B 1/48 187/392 |
| 8,145,785 | B1 * | 3/2012 | Finkelstein | H04L 49/602 709/224 |
| 8,183,994 | B2 * | 5/2012 | Staab | G06Q 10/06 340/568.1 |
| 8,210,321 | B2 * | 7/2012 | Finschi | B66B 1/18 187/388 |
| 8,223,655 | B2 * | 7/2012 | Heinz | H04L 47/82 455/423 |
| 8,296,410 | B1 * | 10/2012 | Myhill | G06F 11/1464 709/223 |
| 8,316,098 | B2 * | 11/2012 | Luna | H04L 67/568 709/224 |
| 8,352,611 | B2 * | 1/2013 | Maddhuri | G06F 9/5005 709/224 |
| 8,381,880 | B2 * | 2/2013 | Finschi | B66B 1/48 187/388 |
| 8,439,169 | B2 * | 5/2013 | Iio | B66B 1/468 187/387 |
| 8,468,246 | B2 * | 6/2013 | Mays | G06F 9/5083 709/225 |
| 8,490,754 | B2 * | 7/2013 | Amano | B66B 1/2458 187/392 |
| 8,525,652 | B2 * | 9/2013 | Takeuchi | B66B 1/468 187/247 |
| 8,533,403 | B1 * | 9/2013 | Law | G06F 13/1605 711/158 |
| 8,573,366 | B2 * | 11/2013 | Elomaa | B66B 1/2458 187/387 |
| 8,645,750 | B2 * | 2/2014 | Kaneko | G06F 11/07 714/6.1 |
| 8,661,447 | B1 * | 2/2014 | Olliff | G06F 9/4887 718/104 |
| 8,806,486 | B2 * | 8/2014 | Martin | G06F 9/5077 718/1 |
| 8,869,154 | B1 * | 10/2014 | Hillyard | G06F 9/485 718/103 |
| 8,878,671 | B2 | 11/2014 | Buchheim et al. | |
| 8,887,166 | B2 * | 11/2014 | Gerovac | H04L 47/762 711/170 |
| 8,914,511 | B1 * | 12/2014 | Yemini | H04L 67/1001 709/202 |
| 9,014,640 | B2 * | 4/2015 | Krishnaswamy | H04W 4/60 455/67.11 |
| 9,041,556 | B2 * | 5/2015 | Tucker | G01S 5/017 340/932.2 |
| 9,063,775 | B2 * | 6/2015 | Schwartz, Jr. | G06F 9/4812 |
| 9,317,976 | B2 * | 4/2016 | Andrews | G06Q 20/327 |
| 9,323,232 | B2 * | 4/2016 | Blom | G06Q 10/04 |
| 9,469,500 | B2 * | 10/2016 | Friedli | B66B 1/2408 |
| 9,633,493 | B2 * | 4/2017 | Raina | H04W 4/80 |
| 9,651,656 | B2 | 5/2017 | Hall et al. | |
| 9,692,880 | B2 | 6/2017 | Hannon | |
| 9,725,279 | B2 * | 8/2017 | Armistead | B66B 5/0037 |
| 9,790,053 | B2 * | 10/2017 | Kuroda | B66B 1/468 |
| 9,802,788 | B2 * | 10/2017 | Miyajima | B66B 1/3461 |
| 9,802,789 | B2 * | 10/2017 | Kim | B66B 5/0012 |
| 9,865,144 | B2 | 1/2018 | Trani | |
| 9,873,590 | B2 * | 1/2018 | Salmikuukka | G01C 21/206 |
| 9,878,874 | B2 * | 1/2018 | Kondo | B66B 1/468 |
| 9,878,875 | B1 * | 1/2018 | Scoville | H04W 4/021 |
| 9,881,484 | B1 | 1/2018 | Knas et al. | |
| 9,922,294 | B2 * | 3/2018 | Raina | H04W 12/06 |
| 10,009,745 | B2 * | 6/2018 | Somani | H04W 4/80 |

(56) References Cited

U.S. PATENT DOCUMENTS

| | | | |
|---|---|---|---|
| 10,017,355 B2* | 7/2018 | Silvennoinen | G05B 15/02 |
| 10,046,947 B2* | 8/2018 | Haipus | B66B 1/2408 |
| 10,069,781 B2* | 9/2018 | Kumar | H04L 67/535 |
| 10,074,222 B2* | 9/2018 | Raina | G07C 9/20 |
| 10,106,371 B2* | 10/2018 | Hanninen | B66B 1/468 |
| 10,118,797 B2* | 11/2018 | Keser | H04W 4/33 |
| 10,129,698 B2* | 11/2018 | Gillen | H04W 64/006 |
| 10,196,235 B2* | 2/2019 | Silvennoinen | B66B 1/468 |
| 10,203,669 B2* | 2/2019 | Jun | G05B 15/02 |
| 10,207,893 B2* | 2/2019 | Elomaa | B66B 1/468 |
| 10,241,486 B2* | 3/2019 | Finn | G05B 19/042 |
| 10,259,682 B2* | 4/2019 | Blom | H04W 4/029 |
| 10,304,275 B2* | 5/2019 | Dyne | G07B 15/04 |
| 10,325,427 B2* | 6/2019 | Dyne | G06F 3/015 |
| 10,332,096 B2* | 6/2019 | Tilahun | G06Q 20/3223 |
| 10,336,573 B2* | 7/2019 | Hovi | B66B 1/468 |
| 10,358,318 B2* | 7/2019 | Barajas Gonzalez | B66B 1/468 |
| 10,392,222 B2* | 8/2019 | Simcik | B66B 1/468 |
| 10,392,223 B2* | 8/2019 | Simcik | B66B 1/3461 |
| 10,392,224 B2* | 8/2019 | Peterson | B66B 1/468 |
| 10,427,909 B2* | 10/2019 | Chapman | B66B 1/468 |
| 10,479,647 B2* | 11/2019 | Hsu | B66B 1/468 |
| 10,486,938 B2* | 11/2019 | Baldi | B66B 1/468 |
| 10,513,415 B2* | 12/2019 | Fang | G06F 18/24 |
| 10,513,416 B2* | 12/2019 | Fang | G05B 19/042 |
| 10,628,238 B2* | 4/2020 | Schwartz | G06F 9/44521 |
| 10,650,621 B1* | 5/2020 | King | G07C 5/0816 |
| 10,683,190 B2* | 6/2020 | Chapman | B66B 1/468 |
| 10,689,225 B2* | 6/2020 | Barajas Gonzalez | B66B 1/468 |
| 10,947,085 B2* | 3/2021 | Nichols | B66B 1/468 |
| 10,947,086 B2* | 3/2021 | Nichols | B66B 1/468 |
| 11,232,312 B2* | 1/2022 | Chen | G06T 7/50 |
| 11,232,655 B2* | 1/2022 | Bhattacharyya | H04L 67/12 |
| 11,305,964 B2* | 4/2022 | Adifon | B66B 1/468 |
| 11,319,186 B2* | 5/2022 | Adifon | B66B 19/007 |
| 11,323,881 B2* | 5/2022 | Bergdale | G07B 15/04 |
| 11,472,662 B2* | 10/2022 | Adifon | B66B 1/468 |
| 11,505,425 B2* | 11/2022 | Chen | B66B 1/468 |
| 11,535,489 B2* | 12/2022 | Ladi | H04W 4/021 |
| 2002/0032539 A1* | 3/2002 | Tsuji | G01C 5/06 |
| | | | 702/139 |
| 2005/0263355 A1* | 12/2005 | Kostka | B66B 1/18 |
| | | | 187/382 |
| 2007/0006202 A1* | 1/2007 | Mikkelsen | G06F 9/44552 |
| | | | 717/163 |
| 2007/0101279 A1* | 5/2007 | Chaudhri | G06F 3/0481 |
| | | | 715/764 |
| 2007/0168124 A1* | 7/2007 | Dossas | G01C 21/005 |
| | | | 701/481 |
| 2008/0189708 A1* | 8/2008 | Cheng | G06F 9/542 |
| | | | 718/102 |
| 2010/0112955 A1* | 5/2010 | Krishnaswamy | G06F 1/3203 |
| | | | 455/67.11 |
| 2010/0185396 A1* | 7/2010 | Docherty | G01V 1/28 |
| | | | 702/14 |
| 2010/0185758 A1* | 7/2010 | Hoga | H04L 41/0893 |
| | | | 700/9 |
| 2010/0199063 A1* | 8/2010 | Sechrest | G06F 12/122 |
| | | | 711/204 |
| 2010/0302002 A1* | 12/2010 | Guo | H04W 76/10 |
| | | | 340/7.2 |
| 2011/0106449 A1* | 5/2011 | Chowdhary | G01C 21/005 |
| | | | 701/472 |
| 2011/0185396 A1* | 7/2011 | Ohta | G06F 9/451 |
| | | | 726/1 |
| 2011/0200023 A1* | 8/2011 | Murray | G01S 5/0295 |
| | | | 455/41.1 |
| 2011/0239156 A1* | 9/2011 | Lin | G06F 3/04883 |
| | | | 715/788 |
| 2011/0296418 A1* | 12/2011 | Kim | G06F 3/04817 |
| | | | 718/100 |
| 2012/0042189 A1 | 2/2012 | Dangy-Caye | |
| 2012/0054752 A1* | 3/2012 | Chin | H04W 52/0229 |
| | | | 718/100 |
| 2012/0079016 A1* | 3/2012 | Hung | H04L 67/56 |
| | | | 709/203 |
| 2012/0096287 A1* | 4/2012 | Kamath | G06F 1/3203 |
| | | | 713/300 |
| 2012/0185532 A1* | 7/2012 | Kristiansson | G06F 9/54 |
| | | | 709/203 |
| 2012/0260118 A1* | 10/2012 | Jiang | G06F 9/4893 |
| | | | 713/340 |
| 2013/0024812 A1* | 1/2013 | Reeves | G06F 3/1423 |
| | | | 715/810 |
| 2013/0048436 A1* | 2/2013 | Chan | B66B 1/2408 |
| | | | 187/387 |
| 2013/0067438 A1* | 3/2013 | Bates | G06F 9/485 |
| | | | 717/124 |
| 2013/0067494 A1* | 3/2013 | Srour | G06F 9/46 |
| | | | 719/318 |
| 2013/0086365 A1* | 4/2013 | Gschwind | G06F 9/3832 |
| | | | 712/E9.016 |
| 2013/0110773 A1* | 5/2013 | Burger | G06F 16/2453 |
| | | | 707/609 |
| 2013/0176107 A1* | 7/2013 | Dumas | G07C 9/00571 |
| | | | 340/5.61 |
| 2013/0198019 A1* | 8/2013 | Smith | G06Q 20/3278 |
| | | | 705/17 |
| 2013/0257658 A1* | 10/2013 | Hall | G01S 1/68 |
| | | | 342/451 |
| 2014/0025444 A1* | 1/2014 | Willis | G06Q 20/3272 |
| | | | 705/13 |
| 2015/0339871 A1 | 11/2015 | Wagner et al. | |
| 2015/0348049 A1 | 12/2015 | Tadasco et al. | |
| 2017/0061442 A1 | 3/2017 | Barlow et al. | |
| 2017/0193530 A1 | 7/2017 | Newsum et al. | |
| 2018/0018473 A1 | 1/2018 | Knibbe et al. | |
| 2018/0025603 A1 | 1/2018 | Tyler et al. | |
| 2019/0152741 A1* | 5/2019 | Wedzikowski | H04W 4/33 |
| 2019/0263627 A1* | 8/2019 | Huang | H04W 4/021 |

FOREIGN PATENT DOCUMENTS

| | | | | |
|---|---|---|---|---|
| WO | | 0060374 A1 | 10/2000 | |
| WO | | 2011009358 A1 | 1/2011 | |
| WO | | 2015130910 A1 | 9/2015 | |
| WO | WO-2016100293 A1 * | | 6/2016 | B66B 1/3461 |
| WO | | 2017180454 A1 | 10/2017 | |
| WO | | 2017221022 A1 | 12/2017 | |

OTHER PUBLICATIONS

Chinese Office Action for Application No. 201810245130.X; dated Dec. 3, 2021; 11 Pages.

Baike, "iBeacon", available at: https://baike.baidu.com/item/iBeacon/13826305?fr=aladdin http://blog.csdn.net/qinxiandiqi/article/details/39004337, accessed: Mar. 20, 2019, 3 pages.

Gimbal, "Proximity", available at: https://docs.gimbal.com/proximity_overview.html, accessed: Mar. 20, 2019, 18 pages.

Lee, Nick, "I Automated My Morning Routine with Ibeacons, and Now I Live in the Future", Tendigi, Jul. 13, 2017, 6 pages.

Robarts, Stu, "myPORT app unlocks doors and calls elevators for you", New Atlas, Dec. 5, 2014, 3 pages.

Stackoverflow, "How to wake up the app with Eddystone in Android", available at: https://stackoverflow.com/questions/47275976/how-to-wake-up-the-app-with-eddystone-in-android, accesed: Mar. 20, 2019, 4 pages.

Yang, Jingjing, et al., "An iBeacon-based Indoor Positioning Systems for Hospitals", International Journal of Smart Home, vol. 9, No. 7 (2015), pp. 161-168.

Zafari, Faheem, et al., "Microlocation for Internet-of-Things-Equipped Smart Buildings", Published in IEEE Internet of Things Journal 2016, 4 pages.

(56) References Cited

OTHER PUBLICATIONS

Zhihu, "Eddystone iBeacon", available at: https://www.zhihu.com/question/32708729, accessed: Mar. 20, 2019, 2 pages.

* cited by examiner

WIRELESS SIGNAL DEVICE, SYSTEM AND METHOD FOR ELEVATOR SERVICE REQUEST

FOREIGN PRIORITY

This application claims priority to Chinese Patent Application No. 201810245130.X, filed Mar. 23, 2018, and all the benefits accruing therefrom under 35 U.S.C. § 119, the contents of which in its entirety are herein incorporated by reference.

TECHNICAL FIELD

The present invention belongs to the field of intelligent Elevator control technologies, and relates to automatic completion of an elevator service request based on interaction between a wireless signal apparatus and a personal mobile terminal, and particularly to a wireless signal apparatus, an elevator service request system, an elevator service request method, and an elevator system.

BACKGROUND ART

In an existing elevator system, one of the commonly used elevator call operation methods is as follows: a passenger manually presses an elevator call button on an elevator call request input device installed in an elevator landing zone to input an up or down elevator call request command, and then enters an elevator car. Such an elevator call request operation method requires a manual operation. As a result, the elevator call request operation is difficult, especially when passengers cannot perform the button pressing operation freely with hands (for example, when the passenger is carrying things in both hands or when the passenger who has difficulty in walking is sitting in a wheelchair), affecting the passenger experience.

With the development of automatic elevator call operation technologies, various technologies for automatically implementing an elevator service request operation using a personal mobile terminal such as a mobile phone have emerged. However, the passenger experience still needs to be continually improved.

SUMMARY OF THE INVENTION

According to a first aspect of the present invention, an elevator service request system is provided, wherein a corresponding wireless signal is broadcast by a wireless signal apparatus of an elevator system and the wireless signal is received by a personal mobile terminal, the personal mobile terminal being provided with an elevator service request application component running at an application layer of an operating system thereof, wherein the wireless signal apparatus is provided with a location notification unit used for broadcasting corresponding location marker data; and the elevator service request system includes a wake-up module running at a system layer of the operating system of the personal mobile terminal, and the wake-up module is used for waking up the elevator service request application component in response to reception of the location marker data.

In the elevator service request system according to an embodiment of the present invention, the location notification unit is used for broadcasting the corresponding location marker data based on a location marker protocol.

In the elevator service request system according to an embodiment of the present invention, the wake-up module is implemented by the operating system, which supports the location marker protocol, of the personal mobile terminal.

In the elevator service request system according to an embodiment of the present invention, the elevator service request application component installed on the personal mobile terminal is capable of referencing a location marker service provided by the operating system.

In the elevator service request system according to an embodiment of the present invention, the wake-up module is further used for determining the elevator service request application component according to the location marker data received.

In the elevator service request system according to an embodiment of the present invention, the location marker data includes a location marker identifier corresponding to the wireless signal apparatus, and the location marker identifier and an association relationship between the location marker identifier and the elevator service request application component are registered with the wake-up module.

In the elevator service request system according to an embodiment of the present invention, the wake-up module is further used for transmitting the location marker data to the elevator service request application component determined thereby.

In the elevator service request system according to an embodiment of the present invention, when being woken up, the elevator service request application component is capable of enabling the personal mobile terminal to automatically establish a wireless communication with the wireless signal apparatus and send an elevator service request command to the wireless signal apparatus.

In the elevator service request system according to an embodiment of the present invention, the wireless signal apparatus further includes: a wireless communication unit for broadcasting corresponding wireless communication data and establishing a corresponding wireless communication with the personal mobile terminal based on a wireless communication protocol.

In the elevator service request system according to an embodiment of the present invention, the wireless signal apparatus is a Bluetooth Low Energy module, the wireless signal is a Bluetooth Low Energy signal, and the wireless communication is a According to a second aspect of the present invention, an elevator service request method is provided, including steps of: receiving location marker data broadcast by a wireless signal apparatus of an elevator system; and waking up, from a system layer of an operating system of a personal mobile terminal, an elevator service request application component at an application layer in response to the reception of the location marker data.

In the elevator service request method according to an embodiment of the present invention, before waking up the elevator service request application component, the elevator service request application component does not run at the application layer of the operating system of the personal mobile terminal.

In the elevator service request method according to an embodiment of the present invention, the wireless signal apparatus broadcasts the location marker data based on a location marker protocol; and the operating system supports the location marker protocol and wakes up the elevator service request application component through the operating system.

In the elevator service request method according to an embodiment of the present invention, the elevator service request application component is capable of referencing a location marker service provided by the operating system.

In the elevator service request method according to an embodiment of the present invention, the wake-up step includes: determining the elevator service request application component according to the location marker data received; and transmitting the location marker data to the elevator service request application component determined thereby.

In the elevator service request method according to an embodiment of the present invention, the location marker data includes a location marker identifier corresponding to the wireless signal apparatus; and the elevator service request method further includes a step of: registering the location marker identifier with the operating system to form an association relationship between the location marker identifier and the In the elevator service request method according to an embodiment of the present invention, in the receiving step, wireless communication data broadcast by the wireless signal apparatus based on a wireless communication protocol is further received.

The elevator service request method according to an embodiment of the present invention further includes a step of: transmitting the wireless communication data to the elevator service request application component that is woken up.

In the elevator service request method according to an embodiment of the present invention, the wireless signal apparatus is a Bluetooth Low Energy module, the wireless communication protocol is a Bluetooth Low Energy communication protocol, and the wireless communication data is Bluetooth Low Energy communication data.

According to an embodiment of the present invention, the elevator service request method further includes steps of: establishing a wireless communication between the wireless signal apparatus and the personal mobile terminal through the elevator service request application component that is woken up; and sending an elevator service request command to the wireless signal apparatus.

According to a third aspect of the present invention, a computer device is provided, including a memory, a processor, and a computer program that is stored in the memory and can run on the processor, wherein when executing the program, the processor implements the steps of any one of the above-mentioned elevator service request methods.

According to a fourth aspect of the present invention, a computer readable storage medium storing a computer program is provided, wherein the computer program is executed by a processor to perform the steps of any one of the above-mentioned elevator service request methods.

According to a fifth aspect of the present invention, a wireless signal apparatus is provided, which is installed in an elevator system and used for performing wireless interaction with a personal mobile terminal carried by a passenger to receive an elevator service request command from the personal mobile terminal, wherein the wireless signal apparatus includes a location notification unit used for broadcasting corresponding location marker data.

In the wireless signal apparatus according to an embodiment of the present invention, the location notification unit is used for broadcasting the corresponding location marker data based on a location marker protocol.

In the wireless signal apparatus according to an embodiment of the present invention, the wireless signal apparatus further includes: a wireless communication unit for broadcasting corresponding wireless communication data and establishing a corresponding wireless communication with the personal mobile terminal based on a wireless communication protocol.

In the elevator service request system according to an embodiment of the present invention, the location marker data includes a location marker identifier corresponding to the wireless signal apparatus.

In the wireless signal apparatus according to an embodiment of the present invention, the wireless signal apparatus is a Bluetooth Low Energy module.

According to a sixth aspect of the present invention, an elevator system is provided, including: any one of the above-mentioned wireless signal apparatuses, installed in an elevator landing zone and/or an elevator car; and an elevator controller for controlling operation of one or more elevator cars in the elevator system, wherein the elevator controller is coupled to the wireless signal apparatus and at least controls the operation of the one or more elevator cars in the elevator system in response to an elevator service request command.

The elevator system according to an embodiment of the present invention further includes any one of the above-mentioned elevator service request systems.

The foregoing features and operations of the present invention will become more apparent from the description below and the accompanying drawings.

BRIEF DESCRIPTION OF THE DRAWINGS

The following detailed description in combination with the accompanying drawings will make the foregoing and other objectives and advantages of the present invention more complete and clear, wherein identical or similar elements are denoted by identical reference numerals.

DETAILED DESCRIPTION

The present invention is now described more thoroughly with reference to the accompanying drawings. The drawings show exemplary embodiments of the present invention. However, the present invention can be implemented in many different ways, and should not be construed as being limited by the embodiments illustrated herein. On the contrary, these embodiments are provided to make the present disclosure thorough and complete, and fully convey the concept of the present invention to those skilled in the art.

Some block diagrams shown in the accompanying drawings are functional entities, which do not necessarily correspond to physically or logically independent entities. The functional entities can be implemented in the form of software, or implemented in one or more hardware modules or integrated circuits, or implemented in different processing apparatuses and/or microcontroller apparatuses.

Figure 1:
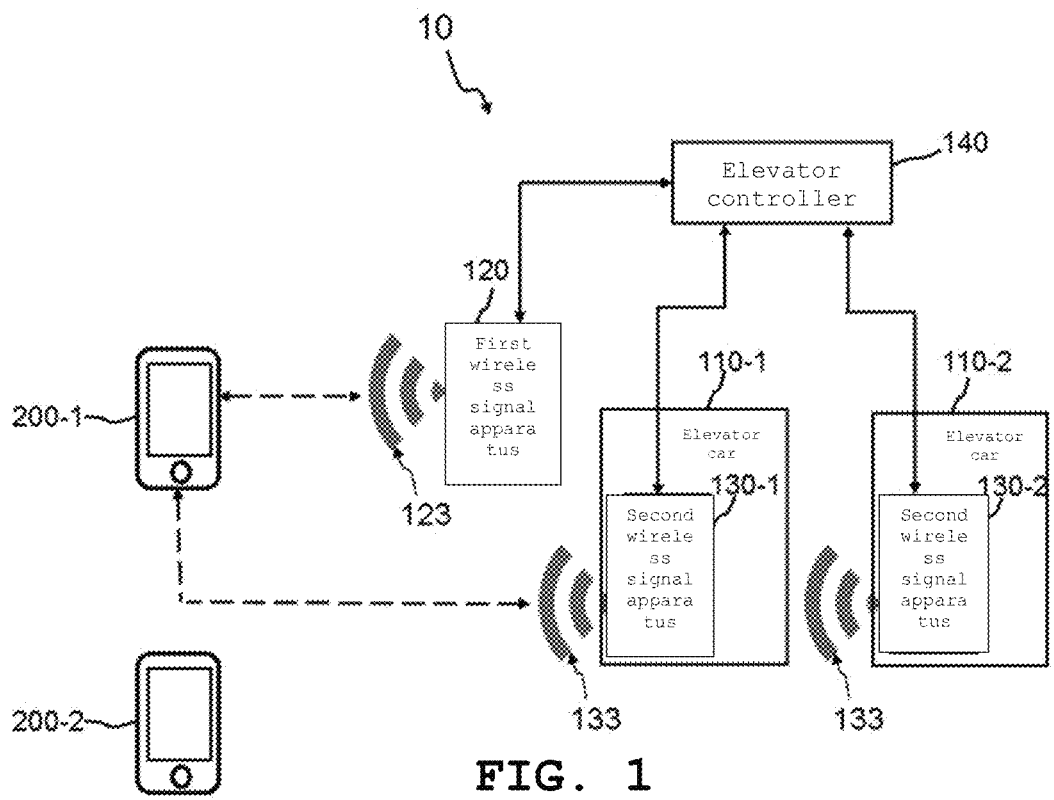
FIG. 1 is a schematic diagram of an elevator system according to an embodiment of the present invention, in which an elevator service request system according to an embodiment of the present invention is used.
Figure 2:
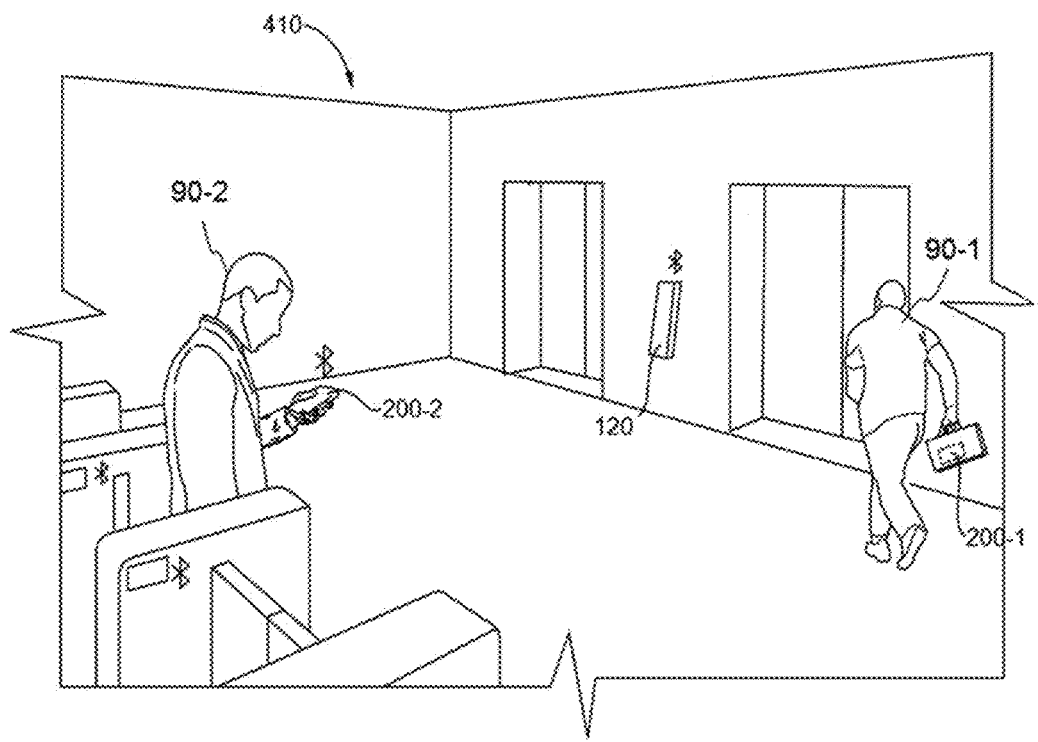
FIG. 2 is a schematic diagram of an application scenario of an elevator service request system according to an embodiment of the present invention.
Figure 3:
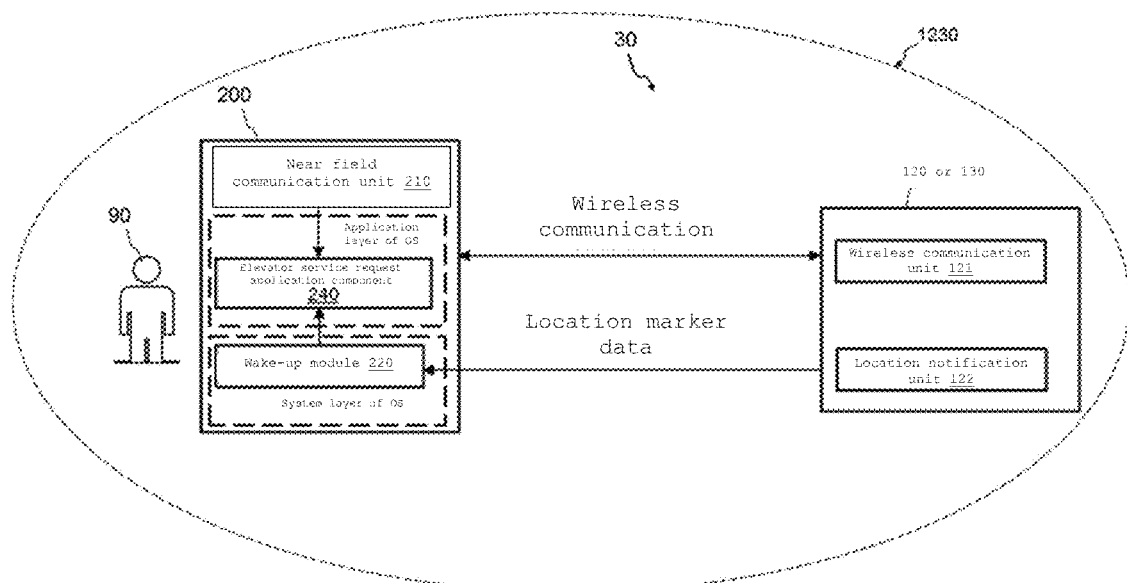
FIG. 3 is a schematic diagram of an elevator service request system according to an embodiment of the present invention.

FIG. 1 is a schematic diagram of an elevator system according to an embodiment of the present invention, in which an elevator service request system according to an embodiment of the present invention is used; FIG. 2 is a schematic diagram of an application scenario of an elevator service request system according to an embodiment of the present invention; FIG. 3 is a schematic diagram of an elevator service request system according to an embodiment of the present invention. A wireless signal apparatus, an elevator system 10, and an elevator service request system 30 according to an embodiment of the present invention are illustrated in detail below by way of example in combination with FIG. 1, FIG. 2, and FIG. 3.

The elevator system 10 according to the embodiment of the present invention can be installed in various buildings. The elevator system 10 includes multiple elevator cars 110 that can travel vertically in a hoistway of a building. FIG. 1 shows two of the elevator cars: elevator cars 110-1 and 110-2. Each elevator car 110 is under the control (e.g. scheduling control and travel control) of an elevator controller 140 in the elevator system 10, so as to travel in the hoistway or stop at the corresponding landing. Generally, the elevator controller 140 needs to acquire elevator service request commands from the elevator landing zone 410 of each floor, and then control the running of the elevator based on the commands, for example, performing scheduling control on each elevator car 110. It will be understood that the specific control manner or control principle of the elevator controller 140 to one or more elevator cars 110 is not limited, and the specific structure or arrangement manner etc. of the elevator controller 140 is not limited either.

The elevator service request command may specifically be an elevator service request command representing an elevator call request (i.e. an elevator call request command) and/or an elevator service request command representing a destination floor (i.e. a destination floor registration command).

In order to acquire the elevator call request command from each elevator landing zone 410, a first wireless signal apparatus 120 according to an embodiment of the present invention is provided in the elevator system 10 of the elevator service request system 30 used. The first wireless signal apparatus 120 can be installed in each elevator landing zone 410 of the elevator system 10 (as shown in FIG. 2). For example, at least one first wireless signal apparatus 120 is installed in each elevator landing zone 410 of each floor, so that first wireless signals 123 sent out or broadcast by the first wireless signal apparatuses 120 can effectively cover each elevator landing zone 410 approximately, thus forming a corresponding coverage area 1230 (as shown in FIG. 3). It should be noted that, the signal strength of the first wireless signal 123 broadcast by the first wireless signal apparatus 120 attenuates with its propagation distance. The specific attenuation manner is not limited herein.

Still as shown in FIG. 1, the elevator system 10 further includes one or more second wireless signal apparatuses 130 (e.g. second wireless signal apparatuses 130-1 and 130-2) according to an embodiment of the present invention. Each second wireless signal apparatus 130 is installed in the corresponding elevator car 110. For example, one second wireless signal apparatus 130-1 is provided in the elevator car 110-1 and one second wireless signal apparatus 130-2 is provided in the elevator car 110-2. In an embodiment, the second wireless signal apparatus is installed on a destination floor registration control panel in the elevator car 110, and is provided on the destination floor registration control panel by way of integration. The installation manner of the second wireless signal apparatus 130 with respect to the elevator car 110 is not limited to the above example.

The second wireless signal apparatus 130 can transmit or broadcast a second wireless signal 133, for example, broadcast the second wireless signal 133 continuously (e.g. at short time intervals). The signal strength of the second wireless signal 133 that is broadcast attenuates with its propagation distance. The specific attenuation manner is not limited herein. The second wireless signal 133 broadcast by the second wireless signal apparatus 130 can effectively cover its installation area in the elevator car 110 approximately, thus forming a corresponding coverage area 1230 (as shown in FIG. 3).

It should be noted that the first wireless signal apparatus 120 and/or the second wireless signal apparatus 130 is coupled to the elevator controller 140, so that during running of each elevator car 110, the first wireless signal apparatus 120 and/or the second wireless signal apparatus 130 can acquire, in real time from the elevator controller 140, required information such as current floor information and traveling direction information of the elevator car 110.

In an embodiment, the first wireless signal apparatus 120 and/or the second wireless signal apparatus 130 can be a Bluetooth module, and can specifically be a Bluetooth Low Energy (BLE) module. Correspondingly, the first wireless signal 123 transmitted or broadcast by the first wireless signal apparatus 120 and/or the second wireless signal 133 transmitted or broadcast by the second wireless signal apparatus 130 may be a Bluetooth signal (e.g. a BLE signal). Thereby, the power consumption and costs of the elevator service request system can be greatly reduced.

The first wireless signal apparatus 120 and/or the second wireless signal apparatus 130 performs wireless interaction with a personal mobile terminal 200 carried by a passenger 90 to receive an elevator service request command from the personal mobile terminal 200, thus automatically completing a corresponding elevator service request operation. For example, as shown in FIG. 1, the first wireless signal apparatus 120 and the second wireless signal apparatus 130 can respectively interact with personal mobile terminals 200-1 and 200-2 carried by two passengers 90.

In an embodiment, the first wireless signal apparatus 120 and/or the second wireless signal apparatus 130 can perform near field communication interaction with the personal mobile terminal 200, to at least implement the transmission of the elevator service request command generated by the personal mobile terminal 200 to the first wireless signal apparatus 120 and/or the second wireless signal apparatus 130. To this end, as shown in FIG. 3, each personal mobile terminal 200 may be provided with a near field communication unit 210, such as a Bluetooth module or a Wifi module. The first wireless signal apparatus 120 and the second wireless signal apparatus 130 may each be provided with a wireless communication unit 121.

The wireless communication unit 121 is used for broadcasting corresponding wireless communication data and establishing a corresponding wireless communication with the personal mobile terminal 200 based on a wireless communication protocol (for example, when particular preset conditions are met). The wireless communication protocol may be, for example, a Wifi communication protocol, and the corresponding wireless communication data may be, for example, Wifi communication data; the wireless communication protocol may also be, for example, a BLE communication protocol such as an iBeacon communication protocol or an EddyStone communication protocol, and the corresponding wireless communication data may be, for example, BLE communication data. Broadcasting of the wireless communication data can be implemented by broadcasting the wireless signal 123 or 133.

The near field communication unit 210 can be used to sense the first wireless signal 123 or the second wireless signal 133, for example, sense the first wireless signal 123 or the second wireless signal 133 by way of scanning. In this way, each personal mobile terminal 200, when approaching the first wireless signal apparatus 120 or the second wireless signal apparatus 130, is able to sense and receive the wireless signal broadcast by the wireless signal apparatus of the elevator system 10. The near field communication unit 210 may be further used to establish a corresponding wireless communication with the wireless communication unit 121 (for example, when particular preset conditions are met). When the wireless communication is established, the near field communication unit 210 can send data such as an elevator service request command to the wireless communication unit 121, and the wireless communication unit 121 can receive corresponding data.

Still as shown in FIG. 1 and FIG. 3, in the elevator service request system 30 according to an embodiment of the present invention, the elevator service request system 30 can transmit or broadcast a corresponding wireless signal using the first wireless signal apparatus 120 and/or the second wireless signal apparatus 130. In addition, the elevator service request system 30 according to an embodiment of the present invention is partially implemented in the personal mobile terminal 200 carried by the passenger 90. As an example, the personal mobile terminal 200 downloads a corresponding application module and installs the application module to install an elevator service request application component 240. By running the elevator service request application component 240, the elevator service request system 30 is partially implemented. This helps implement some automatic elevator service request functions of the elevator service request system 30, for example, achieve a seamless elevator call without performing any operation.

It should be noted that the elevator service request application component 240 may be implemented by using an APP, and is generally an application component run at an Application layer (or referred to as a system application layer) of an Operation System (OS) of the personal mobile terminal 200. As an example, the elevator service request application component 240 may run in the background of the OS in a screen-off state. When the elevator service request application component 240 is running at the application layer, the elevator service request application component 240 may be correspondingly presented in a running task list of the OS.

However, it cannot be ensured that the elevator service request application component 240 in the personal mobile terminal 200 runs all the time. For example, to reduce memory usage of the personal mobile terminal 200, the passenger 90 clears all application components (including the elevator service request application component 240) presented on the running task list of the OS, and consequently the elevator service request application component 240 stops running. It will be understood that, when the elevator service request application component 240 stops running, the elevator service request application component 240 cannot run automatically even if the wireless communication unit 121 of the personal mobile terminal 200 senses the wireless signal broadcast by the wireless signal apparatus or receives the corresponding wireless communication data. As a result, some automatic elevator service request functions cannot be implemented, for example, a seamless elevator call cannot be achieved without performing any operation, and the running of the elevator service request application component 240 needs to be activated through a manual operation of the passenger 90, greatly reducing the elevator riding experience of the passenger 90.

In the elevator service request system 30 according to the embodiment shown in FIG. 3, to ensure that the elevator service request application component 240 can automatically run at the application layer of the OS when the passenger 90 enters, for example, the coverage area 1230 of the wireless signal (regardless of whether the elevator service request application component 240 has already stopped running before the passenger enters the coverage area 1230 of the wireless signal), a location notification unit 122 is provided in the corresponding first wireless signal apparatus 120 and/or second wireless signal apparatus 130 in the elevator service request system 30, and the elevator service request system 30 further includes a wake-up module 220 running at the system layer of the OS of the personal mobile terminal 200.

The location notification unit 122 is used for broadcasting corresponding location marker data. The location notification unit 122 may specifically broadcast the corresponding location marker data based on, but not limited to, a location marker protocol. The location notification unit 122 may be formed by a beacon used for broadcasting data, and may be implemented to be integrated with the wireless communication unit 121 of the first wireless signal apparatus 120 or the second wireless signal apparatus 130, or can also be implemented independently from the wireless communication unit 121. The specific implementation form of the location notification unit 122 is not limited herein. The location marker data generated by the location notification unit 122 may be broadcast together with the wireless communication data, for example, by the wireless communication unit 121.

In an embodiment, the location marker data may include a location marker identifier (ID) corresponding to the wireless signal apparatus. A corresponding location marker ID may be preset for each of the first wireless signal apparatus 120 and the second wireless signal apparatus 130. Definitely, the location marker IDs of a plurality of first wireless signal apparatuses 120 or second wireless signal apparatuses 130 may be identified, so that for example, the first wireless signal apparatuses 120 or the second wireless signal apparatuses 130 in different elevator systems 10 have different types of location marker IDs.

It should be understood that, with the introduction of the location marker data, the elevator service request system 30 according to the embodiment of the present invention, when sensing a wireless signal broadcast by a wireless signal apparatus, can determine that the personal mobile terminal 200 enters the location of the corresponding wireless signal apparatus. In this way, the elevator service request system 30 learns that the personal mobile terminal 200 needs to perform an elevator service request operation such as automatic elevator call.

The preset location marker ID corresponding to the wireless signal apparatus 120 or 130 may also be learned by the elevator service request application component 240. In this way, the elevator service request application component 240 of each personal mobile terminal 200 may register all the location marker IDs with the wake-up module 220, and may form an association relationship between the location marker ID and the elevator service request application component 240 based on the registration process. Thus, the wake-up module 220 is registered with the location marker ID and the association relationship between the location marker ID and the elevator service request application component 200. The association relationship may be, for example, implemented in the form of a table. However, the specific implementation form of the association relationship is not limited herein.

In an embodiment, the wake-up module 220 is used for waking up the elevator service request application component 240 in response to reception of the location marker data, for example, activate related sub-components in the elevator service request application component 240 that are used for implementing the automatic elevator service request function, to be run at the application layer of the OS, so as to ensure that when the personal mobile terminal 200 enters the area of the corresponding location (e.g. the coverage area 1230), the elevator service request application component 240 at least can run partially automatically.

It should be noted that, because the wake-up module 220 runs at the system layer of the OS, the wake-up module 220 runs along with the OS and can automatically implement the wake-up operation as long as, for example, the personal mobile terminal 200 is in power-on state, even if the elevator service request application component 240 currently stops running.

In an embodiment, the wake-up module 220 is implemented by the OS, which supports the location marker protocol, of the personal mobile terminal 200. This helps simplify the implementation of the wake-up module 220. For example, the personal mobile terminal 200 may automatically implement the wake-up module 220 when installing the OS.

In an embodiment, to achieve the wake-up process, the elevator service request application component 240 installed on the personal mobile terminal 200 is capable of referencing a location marker service provided by the OS of the personal mobile terminal 200.

In an embodiment, the wake-up module 220 is further used for determining the elevator service request application component 240 according to the location marker data received. For example, according to the location marker ID in the received location marker data and the above-mentioned association relationship, the elevator service request application component 240 can be found in an associated manner, for example, from numerous APP components that have been installed in the personal mobile terminal 200, so that the personal mobile terminal 200 can know that the location marker data and the wireless communication data broadcast by the wireless signal apparatus are needed by the elevator service request application component 240 among numerous APP components. The wake-up module 220 further transmits the location marker data to the elevator service request application component 240 determined thereby, to automatically wake up the elevator service request application component 240.

It will be understood that, the wake-up process of the elevator service request application component 240 means that the elevator service request application component 240 is activated from a non-running state (including not running in the background) to a running state. In the running state, at least some sub-components of the elevator service request application component 240 that are woken up can automatically run at the application layer of the personal mobile terminal 200.

When woken up, the elevator service request application component 240 can automatically run, so as to make the personal mobile terminal 200 automatically establish a wireless communication with the wireless signal apparatus and send an elevator service request command to the wireless signal apparatus. As an example, when woken up, the elevator service request application component 240 can receive wireless communication data (BLE data) from the wireless signal apparatus 120 or 130, so as to generate a corresponding elevator service request command, and establish a wireless communication between the near field communication unit 210 and the wireless communication unit 121 of the wireless signal apparatus and then send the elevator service request command to the wireless signal apparatus 120 or 130.

Therefore, the elevator service request system 30 according to the embodiment of the present invention can truly automatically complete the elevator service request operation without performing any operation. In other words, the elevator service request application component 240, whether or not running at the application layer of the OS when the personal mobile terminal 200 senses the wireless signal 123 or 133, can be woken up to automatically complete the elevator service request operation, thereby greatly improving the experience of the passenger.

For clearer understanding of the effects of the elevator service request system 30 according to the embodiment of the present invention, the application scenario of the elevator service request system 30 shown in FIG. 2 is described as an example. As shown in FIG. 2, a personal mobile terminal 200-1 of a passenger 90-1 is placed in a handbag. When moving toward the first wireless signal apparatus 120, the passenger 90-1 will enter the coverage area of the first wireless signal 123 broadcast by the first wireless signal apparatus. Assuming that the elevator service request application component 240 installed in the personal mobile terminal 200-1 is not running at the application layer (for example, the personal mobile terminal 200-1 has never run the elevator service request application component 240 after power on and the elevator service request application component 240 is not in the running task list). In this case, the personal mobile terminal 200-1 also receives location marker data broadcast by the first wireless signal 123, and based on the reception of the location marker data, the elevator service request application component 240 will be automatically woken up. In this way, the personal mobile terminal 200-1 communicates and interacts with the first wireless signal apparatus 120 to automatically complete the elevator service request operation, and the passenger 90-1 does not need to take the personal mobile terminal 200-1 out of the handbag and manually activate the elevator service request application component 240. Similarly, even if the passenger 90-2 is, for example, reading news for example and does not operate on the elevator service request application component 240 of the personal mobile terminal 200-2, the personal mobile terminal 200-2 can automatically complete the elevator service request operation when the passenger 90-2 moves toward the first wireless signal apparatus 120.

Figure 4:
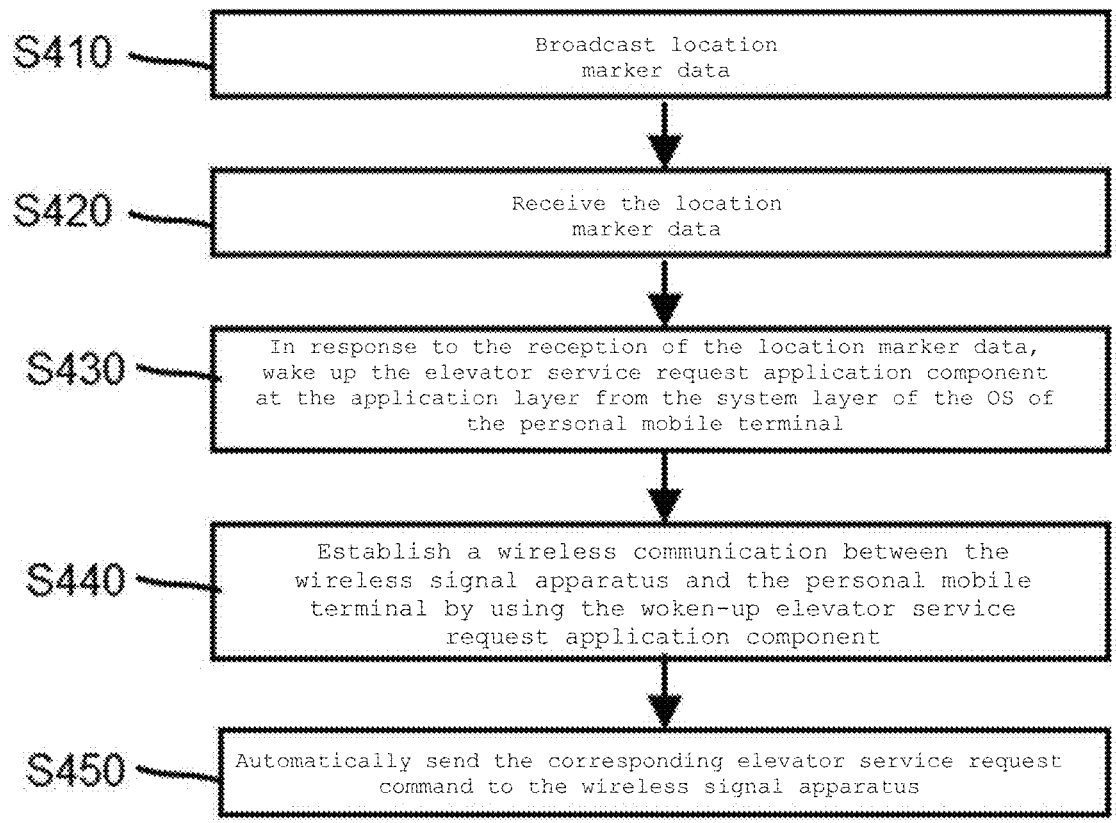
FIG. 4 is a flowchart of an elevator service request method according to an embodiment of the present invention.

FIG. 4 is a flowchart of an elevator service request method according to an embodiment of the present invention. The elevator service request method according to the embodiment may be implemented in the elevator service request system 30 according to the embodiment shown in FIG. 3. The elevator service request method according to the embodiment is described below by way of example in combination with FIG. 3 and FIG. 4.

Step S410, broadcast location marker data. Step S410 may be implemented by a wireless signal apparatus (e.g. the first wireless signal apparatus 120) installed in the elevator system 10. Specifically, the location notification unit 122 shown in FIG. 3 broadcasts the location marker data based on the location marker protocol. The location marker data may be broadcast along with a wireless signal (e.g. the first wireless signal 123), and may also be broadcast along with wireless communication data (e.g. BLE data). The location marker data may further include a location marker ID corresponding to the wireless signal apparatus.

Step S420, receive the location marker data. In this step, for example, when each passenger 90 enters the coverage area 1230 of the wireless signal of the wireless signal apparatus, the location marker data of the wireless signal apparatus may be received by each personal mobile terminal 200, for example, by the near field communication unit 210.

Step S430, in response to the reception of the location marker data, wake up the elevator service request application component 240 at the application layer from the system layer of the OS of the personal mobile terminal 200. Step S430 may be implemented by the wake-up module 220 of the personal mobile terminal 200. The elevator service request application component 240 at the application layer may refer to an elevator service request application component 240 running at the application layer of the OS of the personal mobile terminal 200 (which does not mean that it is currently running at the application layer). In this step, based on the received location marker data, information may be sent from the system layer of the OS to the elevator service request application component 240, to implement the wake-up operation.

In an embodiment, before the elevator service request application component 240 is woken up, the elevator service request application component 240 does not run at the application layer of the OS of the personal mobile terminal 200. It will be understood that, if the elevator service request application component 240 is already running at the application layer of the OS, the above-mentioned step S430 may be omitted.

Step S440, establish a wireless communication between the wireless signal apparatus and the personal mobile terminal 200 using the elevator service request application component 240 that is woken up. Definitely, the elevator service request application component 240 may also generate a corresponding elevator service request command.

Step S450, automatically send the corresponding elevator service request command to the wireless signal apparatus. The elevator service request command is transmitted through the wireless communication established in step S440.

It should be noted that, the above-mentioned step S420 and step S440 are implemented on the personal mobile terminal 200, and may be correspondingly completed in each elevator service request process.

Figure 5:
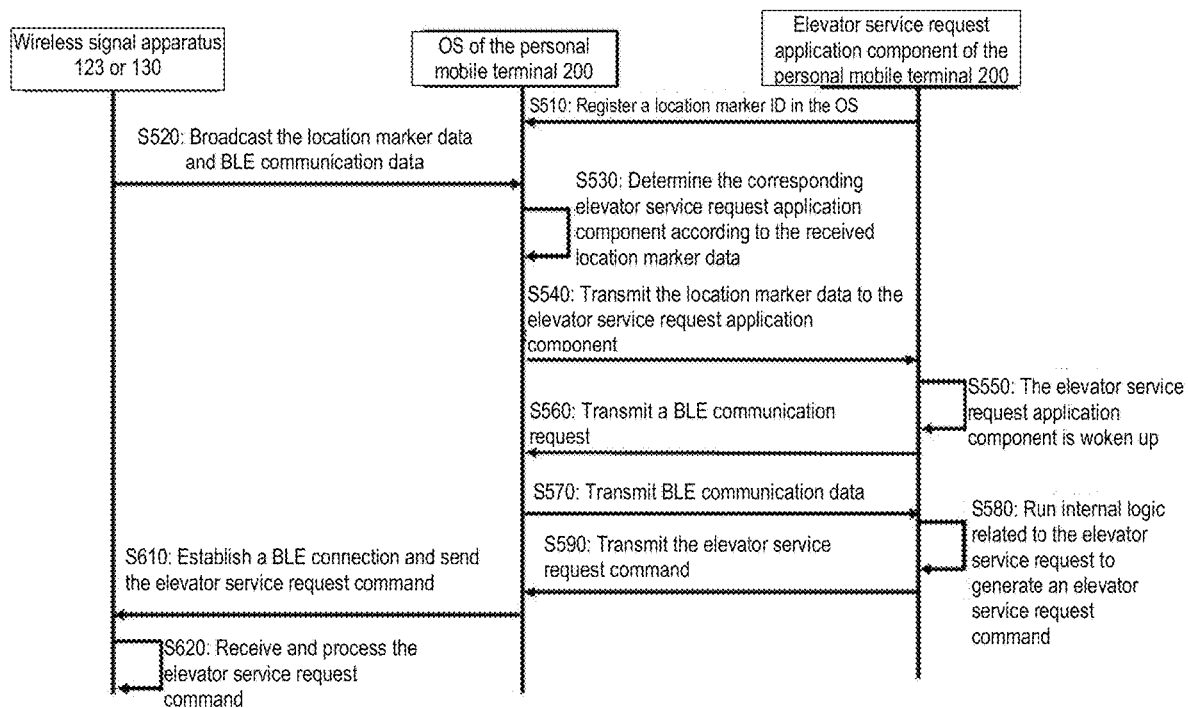
FIG. 5 is a flowchart of an elevator service request method according to another embodiment of the present invention.

FIG. 5 is a flowchart of an elevator service request method according to another embodiment of the present invention. In the embodiment, an example in which the wireless signal apparatus is a BLE module and broadcasts BLE communication data is described.

Step S510, register a location marker ID in the OS. In the embodiment, the OS of the personal mobile terminal 200 supports the location marker protocol which is used to implement the wake-up module 220 shown in FIG. 3.

In step 510, the preset location marker ID corresponding to the wireless signal apparatus 130 may also be learned by the elevator service request application component 240. For example, the location marker ID is learned during the download and installation of the elevator service request application component 240, and the elevator service request application component 240 of each personal mobile terminal 200 may register all location marker IDs with the OS. Based on the registration process, an association relationship between the location marker ID and the elevator service request application component 240 may be formed. Thus, the OS will be registered with the location marker ID and the association relationship between the location marker identifier and the elevator service request application component 240.

Step S520, broadcast the location marker data and BLE communication data. The broadcast process may be implemented by the wireless signal apparatus broadcasting a wireless signal. The wireless signal apparatus that broadcasts the location marker data and the BLE communication data supports both the location marker protocol and the wireless communication protocol.

Step S530, determine the corresponding elevator service application component 200 according to the received location marker data. In this step, the elevator service application component 200 that needs to be woken up may be determined from numerous application components according to the location marker ID in the location marker data and the association relationship between the location marker ID and the elevator service request application component 240.

Step S540, the OS transmits the location marker data to the elevator service application component 200.

Step S550, the elevator service request application component 240 being woken up. In this step, as an example, the elevator service request application component 240 is capable of referencing a location marker service provided by the OS, so as to facilitate the operation of waking up the elevator service request application component 240 based on the received location marker data, for example, activating some sub-components of the elevator service request application component 240 to run at the application layer.

Step S560, the elevator service request application component 240 transmits a BLE communication request to the OS.

Step S570, the OS transmits BLE communication data to the elevator service request application component 240.

Step S580, the elevator service request application component 240 runs internal logic related to the elevator service request to generate an elevator service request command.

Step S590, the elevator service request application component 240 transmits the elevator service request command generated thereby to the OS.

Step S610, establish a BLE connection and send the elevator service request command.

Step S620, receive and process the elevator service request command. Specifically, for example, the elevator service request command may be sent to the elevator controller.

So far, the elevator service request process is basically complete.

It should be noted that, in the elevator service request system and method according to the above embodiments, the personal mobile terminal 200 can specifically be various intelligent terminals having a wireless communication function, and can be conveniently carried by a passenger. For example, the personal mobile terminal 200 may be a smart phone, a wearable smart device (e.g. a smart band), a personal digital assistant (PAD), and so on. The operating system (OS) in the personal mobile terminal 200 may be, but is not limited to, an iOS system or an Android system.

It should be noted that the wake-up module 220 and the elevator service request application component 240 of the elevator service request system 30 according to the above embodiments of the present invention can be implemented by computer program instructions. These computer program instructions can be provided to a processor of a general-purpose computer, a special-purpose computer, or another programmable data processing devices to implement the elevator service request system 30 or the personal mobile terminal 200 according to the embodiments of the present invention. Moreover, the instructions can be executed by the processor of the computer or another programmable data processing devices to create units or components for implementing functions/operations specified in one or more blocks of these flowcharts and/or block diagrams.

Moreover, these computer program instructions can be stored in a computer readable memory. These instructions can instruct the computer or another programmable processor to implement the functions in specific manners, such that these instructions stored in the computer readable memory construct a product including instruction components for implementing functions/operations specified in one or more blocks of the flowcharts and/or block diagrams.

It should be further noted that in some alternative implementations, the functions/operations shown in the blocks may not take place according to the sequence shown in the flowchart. For example, two blocks shown sequentially may practically be performed substantially at the same time, or these blocks sometimes may be performed in a reversed order, which specifically depends on the functions/operations involved.

It should be noted that elements (including the flowcharts and block diagrams in the accompanying drawings) disclosed and depicted in this specification refer to logic boundaries between elements. However, according to software or hardware engineering practices, the depicted elements and functions thereof can be executed on a machine by using a computer executable medium. The computer executable medium has a processor that can execute a program instruction stored thereon. The program instruction serves as a single-chip software structure, an independent software module, or a module using an external program, code, service or the like, or any combination thereof. Moreover, all these execution solutions may fall within the scope of the present disclosure.

Although different non-limitative implementation solutions have components that are specifically illustrated, the implementation solutions of the present invention are not limited to these specific combinations. Some of the components or features from any non-limitative implementation solution may be combined with features or components from any other non-limitative implementation solution.

Although specific step sequences are shown, disclosed and required, it should be understood that the steps may be implemented in any sequence, separated, or combined, and they will still benefit from the present disclosure unless otherwise specified.

The foregoing descriptions are exemplary and are not defined to be limitative. Various non-limitative implementation solutions are disclosed in this specification; however, according to the foregoing teaching, those of ordinary skill in the art will be aware that various modifications and variations will fall within the scope of the appended claims. Therefore, it should be understood that disclosure content other than those specifically disclosed can be implemented within the scope of the appended claims. Therefore, the appended claims should be read up to determine the real scope and content.

What is claimed is:

1. An elevator service request system, comprising:
    a wireless signal apparatus of an elevator system containing a location notification unit, wherein the wireless signal apparatus broadcasts a wireless signal and location marker data;
    an elevator service request application component running at an application layer of an operating system of a personal mobile terminal,
    wherein the wireless signal is received by the personal mobile terminal,
    a wake-up module running at a system layer of the operating system of the personal mobile terminal, and
    wherein the wake-up module is used for waking up the elevator service request application component in response to reception of the location marker data;
    wherein the location notification unit is used for broadcasting the corresponding location marker data based on a location marker protocol, wherein the location marker protocol is a low energy wireless protocol.

2. The elevator service request system according to claim 1, wherein the wake-up module is implemented by the operating system, which supports the location marker protocol, of the personal mobile terminal.

3. The elevator service request system according to claim 2, wherein the elevator service request application component installed on the personal mobile terminal is capable of referencing a location marker service provided by the operating system.

4. The elevator service request system according to claim 1, wherein the wake-up module is further used for determining the elevator service request application component according to the location marker data received.

5. The elevator service request system according to claim 1, wherein the location marker data comprises a location marker identifier corresponding to the wireless signal apparatus, and the location marker identifier and an association relationship between the location marker identifier and the elevator service request application component are registered with the wake-up module.

6. The elevator service request system according to claim 4, wherein the wake-up module is further used for transmitting the location marker data to the elevator service request application component determined thereby.

7. The elevator service request system according to claim 1, wherein when being woken up, the elevator service request application component is capable of enabling the personal mobile terminal to automatically establish a wireless communication with the wireless signal apparatus and send an elevator service request command to the wireless signal apparatus.

8. The elevator service request system according to claim 7, wherein the wireless signal apparatus is further provided with:
    a wireless communication unit for broadcasting corresponding wireless communication data and establishing a corresponding wireless communication with the personal mobile terminal based on a wireless communication protocol.

9. An elevator service request method, comprising steps of:
    receiving location marker data broadcast by a wireless signal apparatus of an elevator system; and
    waking up, from a system layer of an operating system of a personal mobile terminal, an elevator service request application component at an application layer of the operating system in response to the reception of the location marker data at the system layer of the operating system wherein the wireless signal apparatus broadcasts the location marker data based on a location marker protocol, wherein the location marker protocol is a low energy wireless protocol.

10. The elevator service request method according to claim 9, wherein before being woken up, the elevator service request application component does not run at the application layer of the operating system of the personal mobile terminal.

11. The elevator service request method according to claim 9, wherein the operating system supports the location marker protocol and wakes up the elevator service request application component through the operating system.

12. The elevator service request method according to claim 9, wherein the wake-up step comprises:

determining the elevator service request application component according to the location marker data received; and transmitting the location marker data to the elevator service request application component determined thereby.

13. The elevator service request method according to claim 9, further comprising a step of:

transmitting the wireless communication data to the elevator service request application component that is woken up.

14. The elevator service request method according to claim 9, further comprising steps of:

establishing a wireless communication between the wireless signal apparatus and the personal mobile terminal through the elevator service request application component that is woken up; and sending an elevator service request command to the wireless signal apparatus.

15. A computer device, comprising a memory, a processor, and a computer program that is stored in the memory and can run on the processor, wherein when executing the program, the processor implements steps comprising:

receiving location marker data broadcast by a wireless signal apparatus of an elevator system; and waking up, from a system layer of an operating system of a personal mobile terminal, an elevator service request application component at an application layer of the operating system in response to the reception of the location marker data at the system layer of the operating system wherein the wireless signal apparatus broadcasts the location marker data based on a location marker protocol, wherein the location marker protocol is a low energy wireless protocol.

16. A non-transitory computer readable storage medium on which a computer program is stored, wherein the computer program is executed by a processor to implement steps of an elevator service request method comprising:

receiving location marker data broadcast by a wireless signal apparatus of an elevator system; and waking up, from a system layer of an operating system of a personal mobile terminal, an elevator service request application component at an application layer of the operating system in response to the reception of the location marker data at the system layer of the operating system;

wherein the wireless signal apparatus broadcasts the location marker data based on a location marker protocol, wherein the location marker protocol is a low energy wireless protocol.

\* \* \* \* \*